(12) United States Patent
Kim et al.

(10) Patent No.: US 9,386,036 B2
(45) Date of Patent: Jul. 5, 2016

(54) METHOD FOR DETECTING AND PREVENTING A DDOS ATTACK USING CLOUD COMPUTING, AND SERVER

(75) Inventors: Jeong Hun Kim, Seoul (KR); Sung Hyun Kim, Seoul (KR)

(73) Assignee: AHNLAB, INC., Gyeonggi-Do (KR)

( * ) Notice: Subject to any disclaimer, the term of this patent is extended or adjusted under 35 U.S.C. 154(b) by 1016 days.

(21) Appl. No.: 13/386,516

(22) PCT Filed: Jul. 12, 2010

(86) PCT No.: PCT/KR2010/004519
§ 371 (c)(1),
(2), (4) Date: Jan. 23, 2012

(87) PCT Pub. No.: WO2011/010823
PCT Pub. Date: Jan. 27, 2011

(65) Prior Publication Data
US 2012/0124666 A1    May 17, 2012

(30) Foreign Application Priority Data
Jul. 23, 2009  (KR) .................. 10-2009-0067353

(51) Int. Cl.
*H04L 29/06* (2006.01)
(52) U.S. Cl.
CPC ............ *H04L 63/1458* (2013.01); *H04L 63/14* (2013.01); *H04L 63/1441* (2013.01); *H04L 63/1408* (2013.01)
(58) Field of Classification Search
CPC . H04L 63/1458; H04L 63/14; H04L 63/1408; H04L 63/1425
USPC ..................................... 726/22–25
See application file for complete search history.

(56) References Cited

U.S. PATENT DOCUMENTS

| 5,960,170 | A | 9/1999 | Chen et al. |
| 7,617,533 | B1 * | 11/2009 | Hernacki ............ H04L 63/1441 726/22 |

(Continued)

FOREIGN PATENT DOCUMENTS

| KR | 1020040080534 | 9/2004 |
| KR | 1020060049821 | 6/2006 |

(Continued)

OTHER PUBLICATIONS

Dongwon Seo, et al. "A Study on Detecting Malcodes Distribution Sites" (with English Abstract) Journal of the 30th Annual Conference of Information Processing Society, vol. 15, No. 2, Nov. 2008.

(Continued)

*Primary Examiner* — Ali Abyaneh
*Assistant Examiner* — Carlos M De Jesus Lassala
(74) *Attorney, Agent, or Firm* — Bacon & Thomas, PLLC

(57) ABSTRACT

A method for detecting and preventing a Distributed Denial of Service (DDoS) attack in a cloud computing environment including a plurality of clients connected to a server, the method includes collecting, by the server, file deoxyribonucleic acid (DNA) extracted from a file currently being executed by each of the clients and traffic information about network traffic caused by the file, from each client by using an agent that is installed in the client and that monitors the file currently being executed by the client. Further, the method includes analyzing, by the server, a risk level of a DDoS attack based on whether the file DNA of the file is malicious or unidentified and based on the traffic information. Furthermore, the method includes sending a command related to whether to block the file to the client according to the analyzed risk level.

15 Claims, 9 Drawing Sheets

(56) References Cited

U.S. PATENT DOCUMENTS

| | | | |
|---|---|---|---|
| 7,921,462 B2 | 4/2011 | Rooney et al. | |
| 8,332,953 B2* | 12/2012 | Lemieux | G06F 21/88 726/26 |
| RE44,249 E * | 5/2013 | Jung | G06F 21/566 709/224 |
| 2002/0032880 A1* | 3/2002 | Poletto | H04L 12/2602 714/4.1 |
| 2002/0129264 A1* | 9/2002 | Rowland | H04L 63/102 726/26 |
| 2006/0095961 A1* | 5/2006 | Govindarajan | H04L 63/1416 726/15 |
| 2008/0005316 A1* | 1/2008 | Feaver | H04L 51/12 709/224 |
| 2008/0016208 A1* | 1/2008 | Treinen | H04L 63/1416 709/224 |
| 2009/0182614 A1* | 7/2009 | Kekre | G06Q 30/02 705/14.45 |
| 2010/0082513 A1* | 4/2010 | Liu | H04L 63/1458 706/46 |
| 2010/0281539 A1* | 11/2010 | Burns | H04L 63/1441 726/23 |

FOREIGN PATENT DOCUMENTS

| | | |
|---|---|---|
| KR | 100803029 | 2/2008 |
| KR | 1020090012561 | 2/2009 |
| WO | 9841919 | 9/1998 |

OTHER PUBLICATIONS

Kook-Han Kim et al., "Analysis of trends in DoI attacks and response program work" (with English Abstract), Journal of the Information Security & Cryptology, vol. 16, No. 1, Feb. 2006.

Wei-Zhou Lu, et al. "One-way queuing delay measurement and its application on detecting DDoS attack," Journal of Network and Computer Applications 32, pp. 367-376, Jun. 13, 2008.

Jeong Hun Kim, et al. "AhnLab Cloud Computing e-Security Service" (with English translation of the text from pp. 15 to pp. 18), press conference dated Jul. 13, 2009.

* cited by examiner

FIG. 7

| | NETWORK TRAFFIC: GREATER THAN PRESET DDOS THRESHOLD (A) | | |
|---|---|---|---|
| RESULT OF FILE DNA QUERY (B) / DESTINATION OF NETWORK TRAFFIC (C) | MALICIOUS | UNIDENTIFIED | NORMAL |
| INCLUDED IN PROTECTION DESTINATION LIST | IMMEDIATELY BLOCK | IMMEDIATELY BLOCK | PERMIT |
| NOT INCLUDED IN PROTECTION DESTINATION LIST | BLOCK | BLOCK OR CONTINUE TO MONITOR DEPENDING ON RESULTS OF STATISTICAL ANALYSIS | |

| PROGRAM A | FILE A1 (HIGH RISK LEVEL) | PROCESS A1-1 (CAUSE NETWORK TRAFFIC GREATER THAN DDoS THRESHOLD) | THREAD A1-1a |
| --- | --- | --- | --- |
| | | | THREAD A1-1b (GENERATE TRAFFIC FOR DDoS ATTACK) |
| | | PROCESS A1-2 | THREAD A1-2a |
| | FILE A2 | PROCESS A2-1 | THREAD A2-1a |
| | | | THREAD A2-1b |

METHOD FOR DETECTING AND PREVENTING A DDOS ATTACK USING CLOUD COMPUTING, AND SERVER

FIELD OF THE INVENTION

The present invention relates to a method and server for detecting and preventing a Distributed Denial of Service (DDoS) attack using cloud computing; and more particularly, to a method and server for preventing the DDoS attack at the level of a client which is an attacker using a monitoring program installed on the client in a cloud computing environment.

BACKGROUND OF THE INVENTION

A Distributed Denial of Service (DDoS) attack refers to a type of attack in which a plurality of computers are simultaneously operated to cause an excessive load on a specific website. That is, such a DDoS attack takes place by a hacker inserting programs which are tools for the DDoS attack into a plurality of computers and simultaneously transmitting a considerable number of packets that cannot be processed by the system of a specific target website to the target website to attack the target website, thus resulting in the deterioration of network performance or the paralysis of a system due to a system overload. When being DDoS attacked in this way, it is difficult for a user to normally access the website. In a serious case, network equipment or the hardware of the server may be damaged. Recently, as DDoS attacks have spread while exhibiting a criminal propensity to target money, the damage attributable thereto has increased.

Computer systems on which DDoS attack tools have been installed via a route are used as the host of a DDoS attack before they are aware of it. Among these DDoS attack tools, well-known tools include Trinoo, a Tribal Flood Network (TFN), Stacheldraht, and the like. DDoS attack tools invade the computer systems of normal persons by being inserted into malicious code (malware) such as worms or viruses, or by passing through various routes. As the DDoS attack tools are distributed and propagated in various manners, hackers can attack a target website using stronger and more various methods. It is not easy to effectively predict or defend from DDoS attacks due to the plurality of distributed attack sources and the various types of attack patterns.

A conventional DDoS attack detection and prevention technology was implemented using a method of detecting and preventing the unique attack patterns of DDoS or a method of limiting traffic at the level of a network or a server and guaranteeing the validity of the server. Here, the term "unique attack pattern" denotes a pattern in which an excessive number of packets forged in a specific format for each DDoS are generated to impose a load to the server. Representatives of a unique attack pattern include Synchronize sequence Number (SYN) flood, Transmission Control Protocol (TCP) flag flood, Hypertext Transfer Protocol (HTTP) flood, User Datagram Protocol (UDP) flood, and the like.

However, as such DDoS attacks are gradually coming to use normal network packets without using distinctive attack patterns, it is becoming more and more difficult to detect DDoS attacks using attack patterns. Further, DDoS attackers construct a large-scale attacking computer network, such as a botnet, to make detection increasingly more difficult. As more attacking computers are provided, it is possible to make DDoS attacks only by attempting to normally access the server, thus making it further difficult to detect and prevent DDoS attacks.

SUMMARY OF THE INVENTION

In view of the above, the present invention detects and defenses a DDoS attack by collecting pieces of information from a plurality of clients in a cloud computing environment.

In accordance with a first aspect of the present invention, there is provided a method for detecting and preventing a Distributed Denial of Service (DDoS) attack in a cloud computing environment including a plurality of clients connected to a server, the method including: collecting, by the server, file deoxyribonucleic acid (DNA) extracted from a file currently being executed on each of the clients and traffic information about network traffic caused by the file, from each client by using an agent that is installed in the client and that monitors the file currently being executed by the client; analyzing, by the server, a risk level of a DDoS attack based on whether the file DNA of the file is malicious or unidentified and based on the traffic information; and sending a command related to whether to block the file to the client according to the analyzed risk level.

Further, said analyzing may be configured such that the server queries a file DNA statistics database, which stores file DNA statistical information obtained by analyzing file DNAs collected from the plurality of clients, about the file DNA of the file, and then classifies the file as a normal, malicious or unidentified file, and if the network traffic is greater than a preset DDoS threshold and the file is classified as a malicious file, the file is analyzed as having a high risk level, and if the network traffic is greater than the preset DDoS threshold and the file is classified as an unidentified file, the risk level of the file is analyzed based on statistical analysis of the file DNA of the file.

Further, the statistical analysis may be implemented such that if network traffic generated by an identical file or one or more unidentified files in the plurality of clients is greater than the preset DDoS threshold, or if amounts of network traffic generated for an identical destination in the plurality of clients are individually greater than the preset DDoS threshold, or if a number of clients that generate network traffic greater than the preset DDoS threshold, for an identical destination, among the plurality of clients is greater than a preset threshold number of DDoS clients, the file is analyzed as having a high risk level.

Further, if the file DNA of the file is not present in the file DNA statistics database, the file DNA of the file may be stored in the file DNA statistics database, the file DNA statistics database may be queried for file DNA of associated files that are executed together when the file is executed, and if one or more of the associated files are classified as malicious files, the file may be classified as a malicious file.

Further, said sending a command may be configured to send a command to continuously monitor the file to the client if the file is classified as an unidentified file.

Further, one or more of the preset DDoS threshold and the preset threshold number of DDoS clients may be determined based on results of statistical analysis of amounts of network traffic for respective previous destinations stored in the server.

Further, the file DNA statistical information may comprise results of statistical analysis of attribute information including one or more of a file name of a file corresponding to the file DNA collected from each of the plurality of clients, creation date of the file DNA, and a number of times the file is registered in a database, results of statistical analysis of association information including file DNAs of other files that are executed together with the file corresponding to the file DNA collected from the client, and results of statistical analysis of behavior information including one or more of file access, registry access, memory access, and network access performed by the file corresponding to the file DNA collected from the client.

Further, the network traffic may be determined to be an instantaneous measured value of the network traffic or a statistical value of the network traffic obtained for a preset period of time.

Further, said sending a command is configured to send the command to block the file to the client if the file is analyzed as having a high risk level.

Further, one or more of behavior of a program including the file, network behavior of a process of the file, and network behavior of a thread that is included in the process of the file and that generates traffic for the DDoS attack may be designated as prevention targets.

Further, the method may further comprise providing, by the server, the agent to the client.

Further, the client may receive a protection destination list related to destinations desired to be protected, from the server and stores the protection destination list, and if the network traffic is greater than a preset DDoS threshold, and a destination of the network traffic is included in the protection destination list, the client may block the file.

Further, the server may request the client to transmit the traffic information when the network traffic is greater than a preset DDoS threshold.

In accordance with a second aspect of the present invention, there is provided a server for detecting and preventing a Distributed Denial of Service (DDoS) attack, the server being connected to a plurality of clients and configured to detect and prevent the DDoS attack, including: an information-collecting unit for collecting file deoxyribonucleic acid (DNA) extracted from a file currently being executed by each of the clients and traffic information about network traffic caused by the file from the client by using an agent that is a monitoring program installed on the client; a file DNA statistics database for storing file DNA statistical information obtained by analyzing the file DNA collected from the client; an analysis unit for analyzing a risk level of a DDoS attack based on whether the file DNA of the file is malicious or unidentified and based on the traffic information; and a command unit for sending a command related to whether to block the file to the client according to the analyzed risk level.

Further, the analysis unit may query the file DNA statistics database about the file DNA of the file, and then may classify the file as a normal, malicious or unidentified file, and if the network traffic is greater than a preset DDoS threshold and the file is classified as a malicious file, the analysis unit may analyze the file as having a high risk level, and if the network traffic is greater than the preset DDoS threshold and the file is classified as an unidentified file, the analysis unit may analyze the risk level of the file using statistical analysis of the file DNA of the file.

Further, the statistical analysis may be configured such that if network traffic generated by an identical file or one or more unidentified files in the plurality of clients is greater than the preset DDoS threshold, or if amounts of network traffic generated for an identical destination in the plurality of clients are individually greater than the preset DDoS threshold, or if a number of clients that generate network traffic greater than the preset DDoS threshold, for an identical destination, among the plurality of clients is greater than a preset threshold number of DDoS clients, the file is analyzed as having a high risk level.

Further, the analysis unit may be configured such that if the file DNA of the file is not present in the file DNA statistics database, the analysis unit stores the file DNA of the file in the file DNA statistics database, the analysis unit queries the file DNA statistics database about file DNA of associated files that are executed together when the file is executed, and the analysis unit classifies the file as a malicious file if one or more of the associated files are classified as malicious files.

Further, the server may further comprise a traffic statistics database for storing traffic statistical information including a subject causing the network traffic collected from the plurality of clients, a destination of the network traffic, and an amount of network traffic.

Further, the server may further comprise an agent storage unit for storing the agent; and an agent transmission unit for transmitting the agent to the client.

Further, the server may further comprise a protection destination database for storing a protection destination list related to destinations desired to be protected against the DDoS attack, wherein the agent causes the client to block the file if the network traffic is greater than a preset DDoS threshold and a destination of the network traffic is included in the protection destination list.

In accordance with an embodiment of the present invention, it is possible to precisely detect DDoS attacks by collecting file DNAs and pieces of traffic information in real time from a plurality of clients in which monitoring agents are installed in a cloud computing environment.

Further, a server manages the statistics of file DNAs and amounts of network traffic using a database so that it is possible to effectively defend the DDoS attacks while reducing a burden on the security programs on a client side.

Furthermore, the DDoS attacks are detected and defended at the level of an attacker client rather than at the level of a victim server, via cooperation between the server and clients in a cloud computing environment. Accordingly, it is possible to fundamentally cope with the DDoS attacks.

BRIEF DESCRIPTION OF THE DRAWINGS

FIG. 7 is a diagram showing the summary of the results of analyzing files depending on file type and destination according to an embodiment of the present invention;

DETAILED DESCRIPTION OF THE EMBODIMENTS

Figure 1:
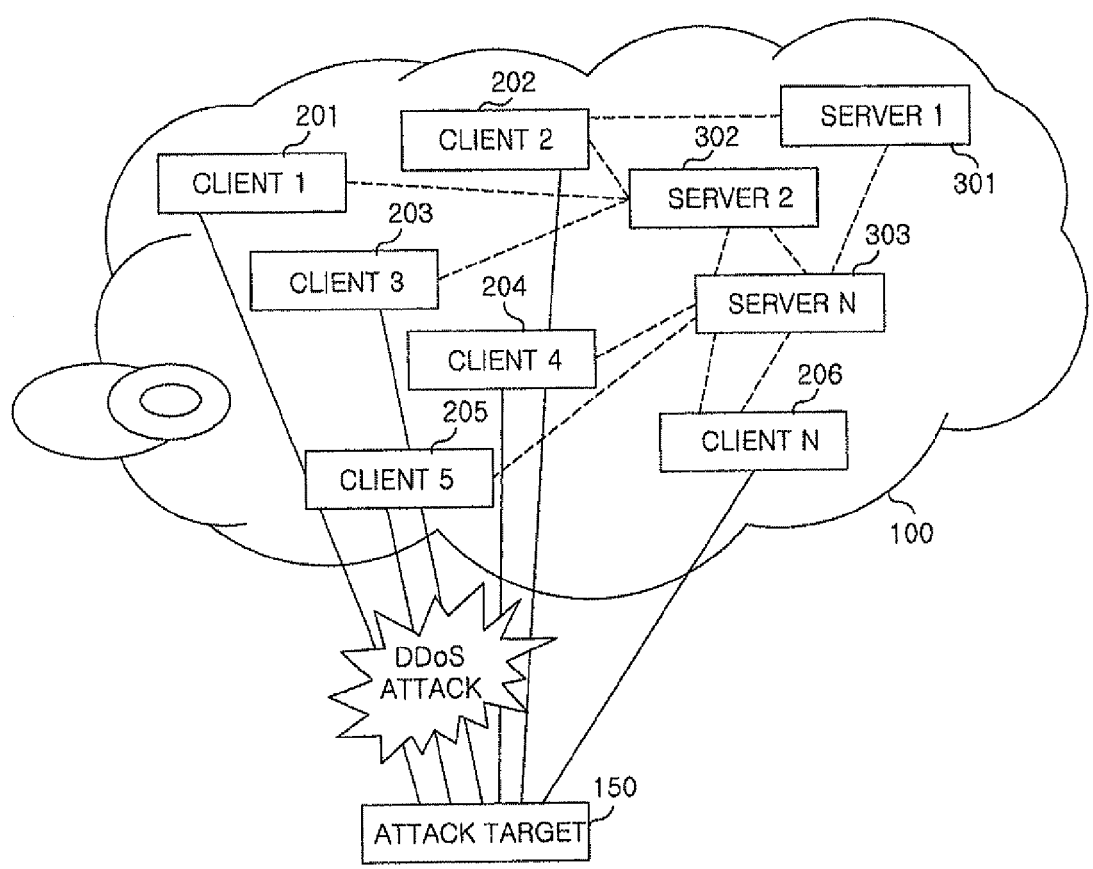
FIG. 1 is a diagram showing a cloud computing environment to which an embodiment of the present invention is applied.

Hereinafter, embodiments of the present invention will be described in detail with reference to the accompanying drawings. FIG. 1 illustrates a cloud computing environment to which the embodiment of the present invention is applied. A plurality of clients 201 to 206 are connected to a plurality of servers 301 to 303 over a network in a cloud computing environment 100. Each of the servers 301 to 303 functions to collect and analyze various types of information from the clients 201 to 206 connected thereto. Each of the clients 201 to 206 may be implemented as various types of equipment enabling networking, for example, a Personal Computer (PC), a notebook computer, or a mobile devices such as a Personal Digital Assistant (PDA) or a cellular phone. On each of the clients 201 to 206, an invaded DDoS attack tool program is installed, and thus each client may be served as a zombie computer for DDoS attack. The clients 201 to 206 that become zombie computers simultaneously commence DDoS attacks on an attack target 150 under the control of the DDoS attack tool program. In this case, each of the servers 301 to 303 may collect various types of information from the plurality of clients 201 to 206 in the cloud computing environment 100 and may use the collected information to detect an indication of a DDoS attack.

Figure 2:
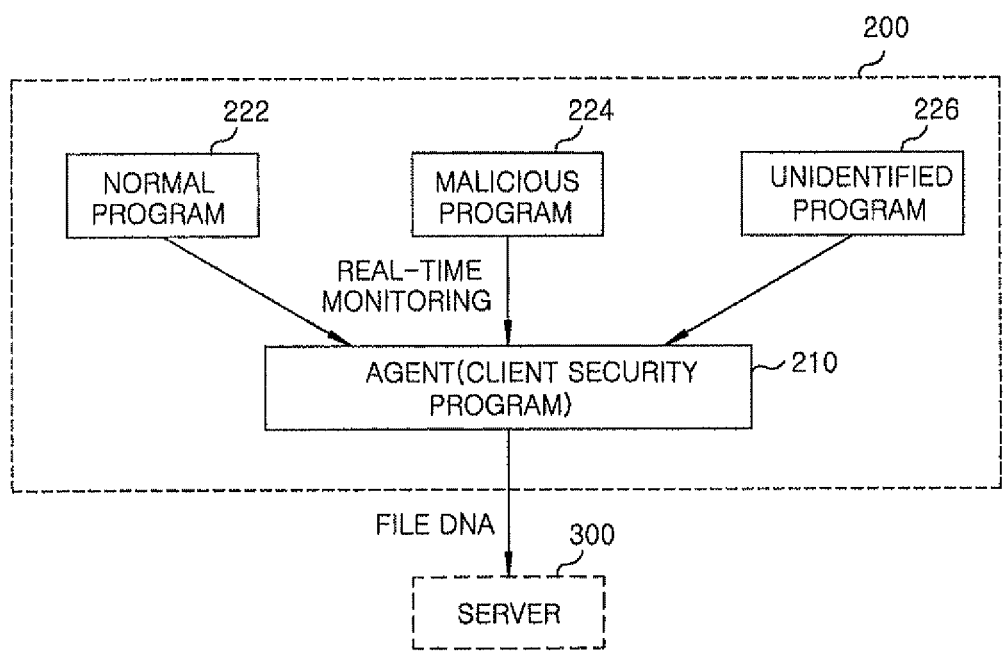
FIG. 2 is a diagram showing the schematic configuration of a client for performing program monitoring using a security program in accordance with an embodiment of the present invention.

FIG. 2 is a diagram showing the schematic configuration of a client for performing program monitoring using a security program in accordance with an embodiment of the present invention. In an embodiment of the present invention, a client 200 may be the collective term for the plurality of clients 201 to 206 shown in FIG. 1, and a server 300 may also be the collective term for the plurality of servers 301 to 303 shown in FIG. 1. The client 200 includes an agent 210 which is a security program for monitoring in real time various types of programs inclusive of a normal program 222, a malicious program 224, and an unidentified program 226 which are installed on the client 200, by using an internal general-purpose data processing unit such as a microprocessor.

The agent 210 may monitor the execution of various types of programs such as the normal program 222, the malicious program 224, and the unidentified program 226 which are executed on the client 200, and relevant files constituting the executed programs while extracting attribute information such as the name, creation date, and feature values of each relevant file, association information about other files executed together with the relevant file, and behavior information related to file access, registry access, memory access, and network access performed by the relevant file. A procedure for extracting the behavior information related to network access or the like may be performed in conjunction with separate network security equipment. Thereafter, the agent 210 queries the file deoxyribonucleic acid (DNA) statistics database (DB) 320 of the server 300 about the extracted file DNA and is then capable of obtaining various types of information including information about whether the relevant file is malicious.

Here, the term "file DNA" denotes attribute information about file identity, such as the unique pattern, identifier or fingerprint of a file detected at a specific location of the file. Such file DNA may include only a minimum of attribute information required to identify a relevant file, but may further include association information such as the file DNAs of other files executed together with the relevant file, or behavior information related to the file access, registry access, memory access, and network access of the relevant file. In accordance with an embodiment of the present invention, the file DNA may be extracted or processed in the form of about 16-byte identification (ID). The agent 210 extracts the file DNA including only attribute information from a file currently being executed and query the server 300 about the file DNA, or may extract file DNA including all of the attribute information, association information and behavior information of the file from the file, and store the extracted file DNA in the file DNA statistics DB 320 of the server.

Figure 3:
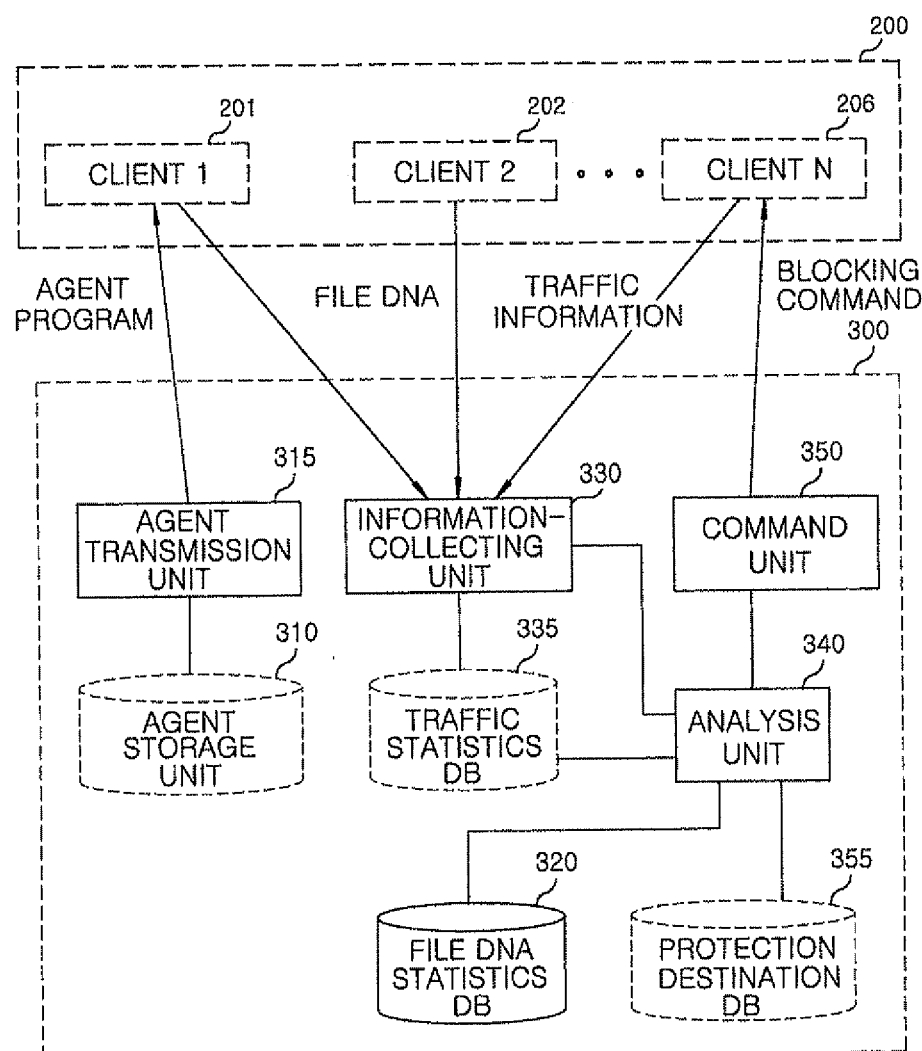
FIG. 3 is a block diagram showing the schematic configuration of a server for detecting and preventing a DDoS attack in accordance with an embodiment of the present invention.

FIG. 3 is a block diagram showing the schematic configuration of the server 300 for detecting and preventing a DDoS attack in accordance with an embodiment of the present invention. The server 300 is connected to a plurality of clients 201 to 206 and collects various types of information from the clients. The server 300 includes an agent storage unit 310, an agent transmission unit 315, a file DNA statistics DB 320, an information-collecting unit 330, a traffic statistics DB 335, an analysis unit 340, a command unit 350, and a protection destination DB 355. These components may be implemented in the form of hardware as detailed modules operating in a single server, or in the form of virtual functional blocks executed in the process of a general-purpose server or computer. Further, some of these components may be implemented as separate servers.

The agent storage unit 310 stores an agent that is a security program installed in each of the clients 201 to 206 to monitor files currently being executed by the clients 201 to 206. When the server 300 presents the results of the analysis of a new DDoS attack based on pieces of information collected from the plurality of clients 201 to 206, the results of the analysis are incorporated into the agent so that the agent storage unit 310 may update the stored agent. The agent may be implemented to be integrated with a security program such as a vaccine, or may be implemented as a separate program.

The agent transmission unit 315 transmits the agent program to the clients 201 to 206 in which the agent will be installed. The agent transmission unit 315 may transmit the agent stored in the agent storage unit 310 in response to the request of the client 201. Further, if the agent has already been installed on the client 201, the agent transmission unit 315 may determine whether the version of the agent is the latest version or the like, and then may automatically transmit the latest version of the agent.

The file DNA statistics DB 320 is a DB which is constructed by analyzing several tens of millions of file DNAs collected from the plurality of clients and which stores pieces of file DNA statistical information for respective types. The pieces of the file DNA statistical information stored in the file DNA statistics DB 320 may include the results of the statistical analysis of attribute information including the file name of a file corresponding to file DNA, the creation date of the file, the number of times the file is registered in the DB, and the like, the results of the statistical analysis of association information which includes the file DNAs of other files that are executed together with the file corresponding to the file DNA, and the results of the statistical analysis for behavior information such as the file access, registry access, memory access, and network access which are performed by the file corresponding to the file DNA. The file DNA statistical information is obtained by collecting and analyzing large-capacity information related to the type of association which specific file DNA has with other files and the type of behavior which the specific file DNA conducts, in a large number of clients 200 in the cloud computing environment 100. When the results of observation related to more than a predetermined number of file DNAs are collected in the file DNA statistics DB 320, it is possible to determine whether a file or a program corresponding to the relevant file DNA is malicious, and the file DNA statistical information may include this type of determined information.

In this way, even if the clients 201 to 206 do not have therein information about a malware signature, they can classify or determine in real time whether a file or program corresponding to relevant file DNA is malicious only by querying the file DNA statistics DB 320 about the file DNA. In view of this, the file DNA statistical information stored in the file DNA statistics DB 320 may also be regarded as an extended concept of the conventional signature. The file DNA statistics DB 320 may analyze file DNAs, which have been collected from the clients 201 to 206, in conjunction with various types of internal and external security-related systems of the server 300 and construct such collected and analyzed DNAs into a DB. During this procedure, an intelligent system, as well as the information-collecting unit 330 and the analysis unit 340 can be used. The intelligent system has incorporated various types of techniques such as various types of program information, reputation systems, behavior-based analysis, the analysis of relations between files, and the analysis of malicious code distribution routes.

The information-collecting unit 330 collects the file DNA of a file currently being executed by each of the clients 201 to 206 and traffic information about network traffic caused by the file from the clients 201 to 206 by using the agent 210 that is installed in each of the clients 201 to 206 and that monitors a file and a program currently being executed by each client 201 to 206. A procedure for collecting traffic information may be performed in conjunction with separate network equipment.

The traffic statistics DB 335 stores traffic statistical information including subjects causing network traffic collected from the clients 201 to 206, the destination of the network traffic and the amount of the network traffic.

The analysis unit 340 analyzes the risk level of a DDoS attack on the basis of the file DNA and the traffic information of the relevant file. A procedure for analyzing a risk level may be implemented using the results of querying the file DNA statistics DB 320, the statistical analysis using the traffic statistics DB 335, a search in the protection destination DB 355, and the like. The DDoS attack risk level analysis procedure performed by the analysis unit 340 will be described in detail later.

The command unit 350 sends to the client 206 a command related to whether to block a relevant file depending on the risk level analyzed by the analysis unit 340. The command unit 350 may send a command to block a file, the risk level of which is determined to be high, to the clients 201 to 206. In accordance with an embodiment of the present invention, the command unit 350 may designate all behavior of a program including the relevant file, the risk level of which is determined to be high, the network behavior of the process of the relevant file, and the network behavior of a thread included in the process of the relevant file to generate the traffic required to make a DDoS attack, as preventing targets.

The protection destination DB 355 may store a list of protection destinations that are destinations desired to be protected against a DDoS attack. The destination protection list may be input from the server 300 or the client 200. The protection destination list in the server 300 may be transmitted to each of the clients 201 to 206 and may be used to prompt the relevant agent 210 to immediately interrupt a specific program.

Figure 4:
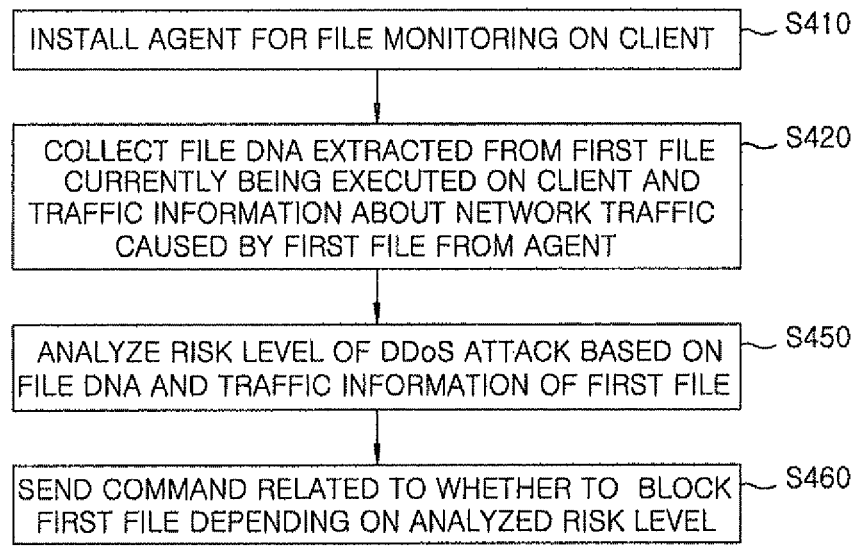
FIG. 4 is a flow chart showing the process of a method of detecting and preventing a DDoS attack in accordance with an embodiment of the present invention.

FIG. 4 is a flow chart showing the process of a method of detecting and preventing a DDoS attack in accordance with an embodiment of the present invention. The DDoS attack detection and prevention method presented in the present embodiment is a method of detecting and preventing a DDoS attack using a plurality of clients connected to a server, and may include the following individual steps.

First, an agent 210 is installed to each client 200 to monitor a file currently being executed by the client 200 in step S410. Since the program of the agent 210 allows the client 200 to transmit or receive various types of information to or from the server 300 and implements the method of detecting and preventing a DDoS attack in the cloud computing environment 100, the agent 210 must be installed on the client 200 so as to perform the method of detecting and preventing a DDoS attack according to the present invention.

Next, the server 300 collects file DNA extracted from the relevant file and traffic information about network traffic caused by the file from the client 200 by using the agent 210 in step S420. In the cloud computing environment, the server 300 may collect various types of information including file DNA and traffic information from a plurality of clients and may construct DBs such as the file DNA statistics DB 320 and the traffic statistics DB 335.

Then, the server 300 analyzes the risk level of a DDoS attack on the basis of the file DNA extracted from the relevant file and the traffic information of the file in step S450. In accordance with an embodiment of the present invention, in a procedure for analyzing the risk level, the file DNA statistics DB 320, the traffic statistics DB 335, and the protection destination DB 355 may be used together with various analysis techniques. A scheme for analyzing the risk level of a DDoS attack in cooperation with an external security system while operating in conjunction with the external security system may also be used. A detailed embodiment of the analysis step S450 will be described in detail later.

Finally, a command related to whether to block the relevant file depending on the analyzed risk level is sent to the client 200 in step S460. The command related to whether to block the file may be sent to the client 200 either directly in the form of a command to block a specific program or indirectly in the form of the process routine of a specific program included in the agent 210.

Figure 5:
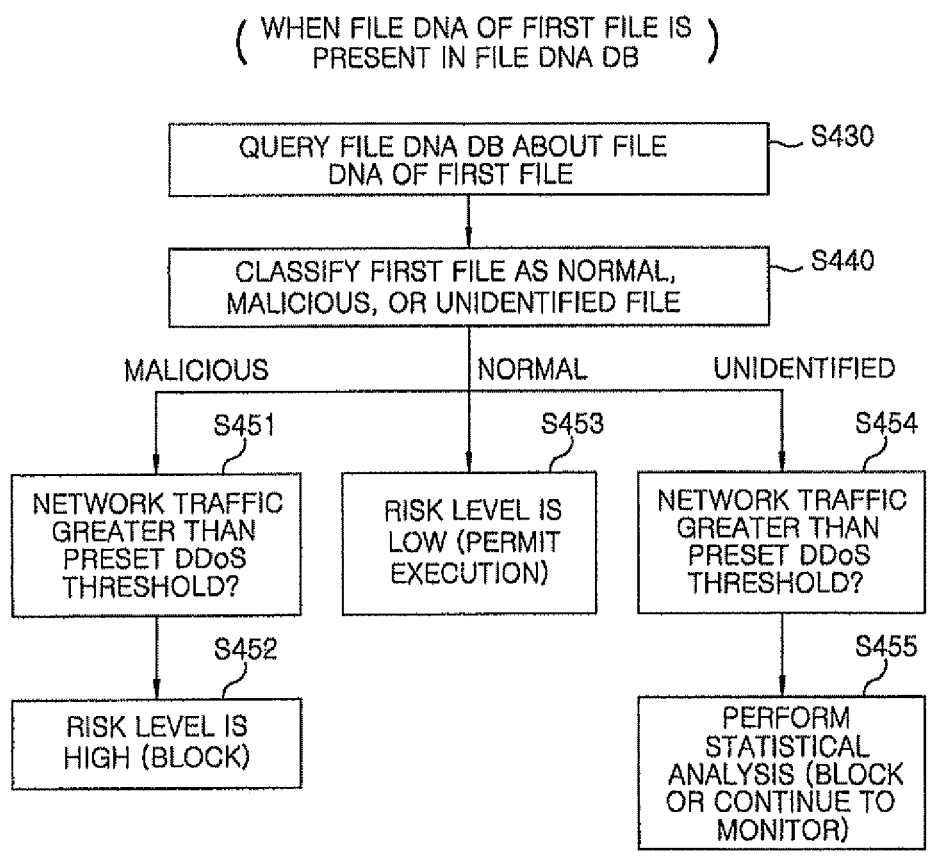
FIG. 5 is a diagram showing a procedure for analyzing the risk level of a DDoS attack in accordance with an embodiment of the present invention.

FIG. 5 is a flow chart showing a procedure for analyzing the risk level of a DDoS attack in accordance with an embodiment of the present invention. The risk level analysis procedure performed after the information collection step S420 in the present embodiment may include the step S430 of querying the file DNA statistics DB 320, the step S440 of classifying the type of a file based on the results of the query, and the steps S451 to S455 of analyzing the risk level of a DDoS attack using the results of the classification and traffic information.

First, the client 200 queries the server 300 about the file DNA extracted by the agent 210 in step S430.

The server 300 checks file DNA statistical information about a plurality of programs stored in the file DNA statistics DB 420 and then determines whether a file or a program corresponding to the queried file DNA is a normal, malicious, or unidentified file or program. Accordingly, the analysis unit 340 classifies the file or program corresponding to the queried file DNA as a normal, malicious or unidentified file or program on the basis of responses which are the results of querying the file DNA statistics DB 320 in step S440.

Thereafter, the analysis unit 340 analyzes the risk level of the DDoS attack using the following processes depending on the results of the classification of the file DNA in steps S451 to S455. For this analysis, the file DNA and the traffic information of a file or program that is executed on the client 200 are used in combination.

First, if the file or program corresponding to the queried file DNA is malicious, the analysis unit 340 determines based on the traffic information whether network traffic caused by the relevant file or program is greater than a preset DDoS threshold in step S451. If the file or program currently being executed by the client 200 is malicious, and the network traffic caused by that file or program is greater than the DDoS threshold, the analysis unit 340 may analyze the risk level of the DDoS attack as being high in step S452. Second, if the file or program corresponding to the queried file DNA is normal, the analysis unit 340 may analyze the risk level of the DDoS attack as being low in step S453. Third, if the file or program corresponding to the queried file DNA is unidentified, the analysis unit 340 compares the network traffic caused by the relevant file or program with the preset DDoS threshold on the basis of the traffic information in relation to whether the network traffic is greater than the preset DDoS threshold, in step S454. Although information about the characteristics of the file or program that has been executed on the client 200 is not stored in the file DNA statistics DB 320, if the network traffic caused by the file or program is greater than the DDoS threshold, the analysis unit 340 can analyze the risk level of the DDoS attack on the basis of statistical analysis that uses pieces of information obtained from other clients 201 to 206 in the cloud computing environment 100 in step S455. The detailed procedure of statistical analysis will be described in detail later. According to an embodiment, if the file DNA of the file is not present in the file DNA statistics DB 320, a procedure for classifying whether the file or program corresponding to the queried file DNA is malicious using the analysis of associated files in steps S441 to S445 presented in FIG. 8 may be primarily performed prior to classifying the file or program as an unidentified file or program.

As the result of the analysis by the analysis unit 340, if it is determined that the risk level of the DDoS attack is high in step S451, the command unit 350 may send a command to block the relevant file or program to the clients 201 to 206. Further, as the result of the statistical analysis, if it is determined that the risk level is high in step S453, the command unit 350 may send a command to block the relevant file or program. In contrast, as the result of the statistical analysis, if it is not determined that the risk level is high in step S454, the command unit 350 may send a command that the agent 210 of the client 200 should continuously monitor a relevant unidentified file or program and transmit various types of additionally collected information to the server 300 until pieces of information required to determine the characteristics of the relevant unidentified file or program are collected from the plurality of clients 201 to 206 in the cloud computing environment 100 and are accumulated in the file DNA statistics DB 320 or the like of the server 300.

Figure 6A:
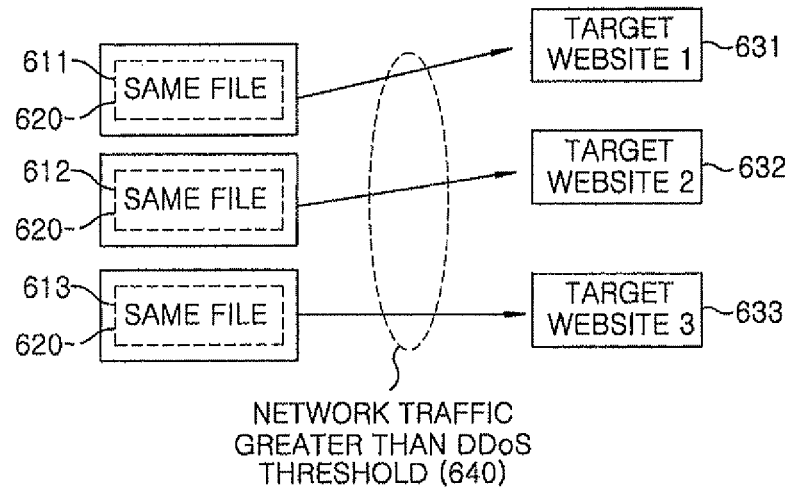
FIGS. 6A and 6B are diagrams illustrating the case where it is determined that the risk level of a DDoS attack is high in a statistical analysis procedure in accordance with an embodiment of the present invention.
Figure 6B:
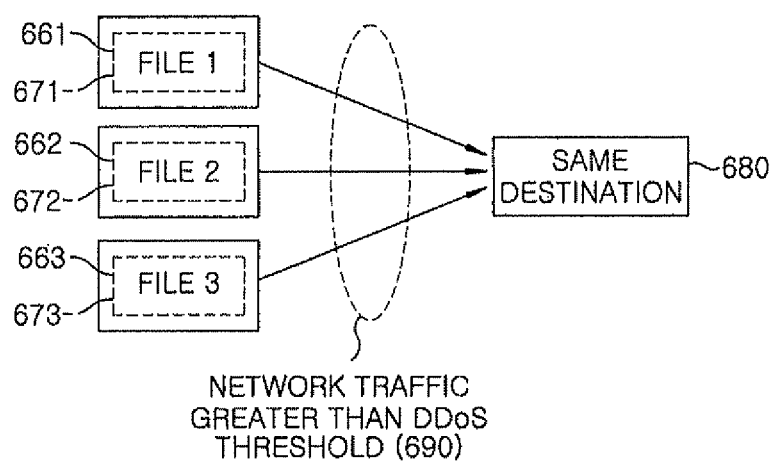

FIGS. 6A and 6B illustrate the case where the risk level of a DDoS attack is determined to be high in the statistical analysis procedure in accordance with an embodiment of the present invention.

FIG. 6A illustrates an example of statistical analysis by which the risk level of a DDoS attack is analyzed as being high when network traffic 640 generated by the same file 620 in a plurality of clients 611, 612 and 613 individually having the same file 620 is greater than a preset DDoS threshold. When the network traffic 640 greater than the DDoS threshold is generated by the same file 620, the risk level of the DDoS attack is analyzed as being high even if destination sites 631, 632 and 633 are different from one another. In accordance with an embodiment of the present invention, the statistical analysis technique can be used to analyze the risk level of a DDoS attack as being high even when amounts of network traffic 640 generated by one or more unidentified files in the plurality of clients 611, 612 and 613 are greater than the preset DDoS threshold. For this statistical analysis, the analysis unit 340 may use the statistical data of network traffic stored in the traffic statistics DB 335 and file DNA statistical information stored in the file DNA statistics DB 320.

FIG. 6B illustrates an example of statistical analysis by which the risk level of a DDoS attack is analyzed as being high in the case where network traffic 690 generated for the same destination 680 by a plurality of clients 661, 662, and 663 having different files 671, 672, and 673 is greater than a preset DDoS threshold. In the case of the network traffic 690 greater than the DDoS threshold for the same destination 680, the risk level of the DDoS attack is analyzed as being high even if the files 671, 672 and 673 that are being executed are different from one another.

For example, in some situations, the case where clients 661, 662 and 663 in the cloud computing environment 100 access the destination "xxx.victim.com" 680 using network traffic 690 greater than the DDoS threshold may be reported to the server 300. In such a situation, if the server 300 usually has statistical analysis data related to the number of clients, which access the destination "xxx.victim.com" 680, or network traffic upon accessing the destination, in the DB such as the traffic statistics DB 335, the analysis unit 340 can be aware of the fact that access to the destination "xxx.victim.com" 680 by the clients 661, 662, and 663 having abnormal traffic 690 has rapidly increased, and can determine on the basis of the above statistical information that the abnormal traffic 690 has been generated because of a DDoS attack.

In this case, a first threshold for the network traffic measured from each of the output terminals of the plurality of clients 661, 662, and 663 may be used as the DDoS threshold. Further, a second threshold resulting from indirectly summing up amounts of network traffic output from the plurality of clients 661, 662, and 663 and input to the same destination 680 in the server 300 of the cloud computing environment 100 may also be used as the DDoS threshold. In accordance with an embodiment of the present invention, the present invention may be implemented such that when the first threshold is used, the risk level of a DDoS attack is determined to be high if the number of clients causing network traffic that is greater than the first threshold is greater than a predetermined number. In this case, a separate threshold for the number of clients that becomes a reference can be set. In another embodiment, the present invention may be implemented such that when the second threshold is used, even if the risk level of a DDoS attack is detected based on amounts of network traffic that are measured from the respective output terminals of a plurality of clients 661, 662, and 663 and that are indirectly summed up by the server 300 in the cloud computing environment 100, actual prevention is performed at the level of the respective clients 661, 662, and 663 by using the server 300 connected thereto over the cloud computing environment 100.

FIG. 7 is a diagram showing the summary of the results of analyzing files depending on the file type and destination in accordance with an embodiment of the present invention. In the present embodiment, if the network traffic is equal to or less than a preset DDoS threshold, the case where the risk level of a DDoS attack is determined to be high is not present. Accordingly, all of the situations that will be described below are conditions presented when network traffic is greater than the preset DDoS threshold.

First, if as the result of querying the file DNA statistics DB 320 that stores file DNA statistical information about file DNA, a relevant file or program is classified as a normal file or program, the analysis unit 340 analyzes the risk level of a DDoS attack as being low, and the command unit 350 may perform processing such that the client 200 permits the execution of the queried file or program.

Further, if the file queried from the file DNA statistics DB 320 is classified as a malicious or unidentified file, processing differs according to the destination information of the network traffic included in the traffic information or the like. First, when the destination of the network traffic caused by the queried file is included in a protection destination list stored in the protection destination DB 355, the analysis unit 340 determines that the risk level of a DDoS attack is high, and the command unit 350 can perform processing such that the client 200 can immediately interrupt the execution of the queried file or program. In accordance with an embodiment of the present invention, if the protection destination list is stored in the client 200, the agent 210 can directly perform such immediate interruption.

In contrast, when the destination of network traffic caused by the queried file is not included in the protection destination list stored in the protection destination DB 355, processing is performed in a different manner depending on the type of the queried file. If the queried file is classified as a malicious file, the analysis unit 340 determines that the risk level of a DDoS attack is high, and the command unit 350 can perform processing such that the execution of the relevant file or program is interrupted.

Meanwhile, if the queried file is classified as an unidentified file, the analysis unit 340 performs the above-described statistical analysis. The command unit 350 may perform processing such that the execution of the relevant file or program is interrupted or such that various types of information are transferred to the server 300 while the file or program is being monitored, depending on the results of the statistical analysis.

In the present embodiment, as criteria for detecting and preventing a DDoS attack in the present embodiment, (A) whether network traffic is greater than a DDoS threshold required to monitor the network traffic, (B) whether file DNA is normal, malicious, or unidentified, and (C) whether the destination of network traffic is included in a protection destination list, are used. Depending on embodiments, the sequence in which such criteria are individually determined may differ.

For example, the analysis step S450 may be performed in the sequence of (B)-(A)-(C). In detail, (B) whether the file DNA extracted from each of programs executed on the plurality of clients 200 is normal, malicious or unidentified is queried from the server 300. Further, when the result of the query indicates that the file DNA is malicious or unidentified, (A) the server 300 provides a warning to the client 200, and then monitors network traffic. Finally, if (C) the network traffic is greater than the DDoS threshold and the destination of the network traffic is included in the protection destination list, the file or program is immediately blocked. Further, if the network traffic is greater than the DDoS threshold, but the destination thereof is not included in the protection destination list, processing may be performed such that the relevant file or program is blocked or such that various types of information are transferred to the server 300 while the relevant file or program is continuously monitored, depending on the results of the statistical analysis.

Unlike this, the analysis step S450 may be performed in the sequence of (A)-(C)-(B). In the present embodiment, (A) network traffic is primarily monitored, so that in the case where network traffic is greater than a DDoS threshold, (C) whether the destination of network traffic is included in the protection destination list is determined. Finally, (B) if it is determined that the destination is included in the protection destination list, the relevant file or program is immediately blocked, whereas if it is determined that the destination of network traffic is not included in the protection destination list, the server 300 is queried about whether the file DNA extracted from the program executed on the client 200 is normal, malicious, or unidentified. Processing may be performed such that if the result of the query indicates that the relevant file or program is malicious, it is blocked, and such that if the result of the query indicates that the relevant file or program is unidentified, it is blocked or various types of information are transmitted to the server 300 while the relevant file or program is continuously monitored, depending on the results of statistical analysis.

Figures 8, 9:
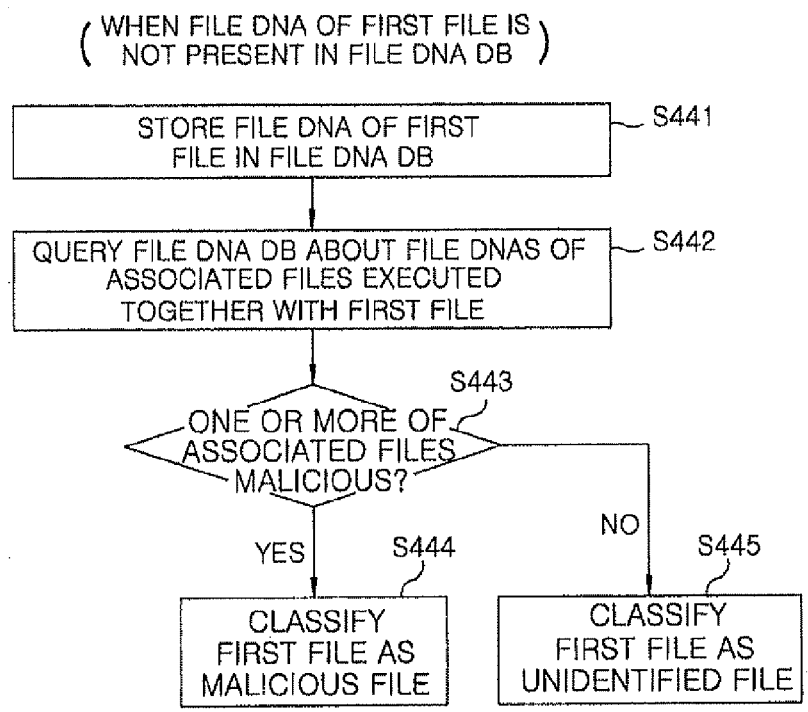
FIG. 8 is a diagram showing a file classification procedure when the file DNA is not present in a file DNA statistics database in accordance with an embodiment of the present invention.
FIG. 9 is a diagram showing the blocking range of files in accordance with an embodiment of the present invention.

FIG. 8 is a diagram showing a file classification procedure when file DNA is not present in the file DNA statistics DB according to an embodiment of the present invention. In a predetermined case where there is a high probability that file DNAs, not stored in the file DNA statistics DB 320, will be malicious, file DNAs that are not present in the file DNA statistics DB 320 are regarded as being malicious rather than being unidentified, on the basis of the relations between files, and are then processed.

First, the queried file DNA is stored in the file DNA statistics DB 320 in step S441. In this case, the stored file DNA may include all of association information and behavior information of the file, as well as the attribute information of the file as in the case of the file DNA statistical information stored in the file DNA statistics DB 320.

As described above, the term "file DNA statistical information" may include all of the results of the statistical analysis of attribute information which includes one or more of the file name of a file corresponding to file DNA, the creation date of the file DNA, the number of times the file is registered in the DB, etc., the results of the statistical analysis of association information which includes the file DNAs of other files that are executed together with the file corresponding to the file DNA, and the results of the statistical analysis of behavior information which includes the file access, registry access, memory access, and network access which are performed by the file corresponding to the file DNA. The attribute information of the file is required to be able to classify whether a relevant file is malicious or not, using only file DNA that has been extracted in a capacity that is as small as an identifier. The association information is required to be able to determine a DDoS attack in some cases even for files having a higher probability of being malicious among files that are not stored in the file DNA statistics DB 320. The behavior information is required to statistically determine whether a relevant file is malicious, on the basis of the file DNAs collected from the plurality of clients 201 to 206.

Next, the file DNA of an associated file that is executed together when the relevant file is executed is queried from the file DNA statistics DB 320 in step S442. Even if unknown file DNA is queried, when one or more of files or programs executed together with the relevant file are malicious in step S443, it is assumed that the relevant unidentified file or program will also have a high probability of being malicious. On this assumption, if associated files are malicious, the relevant file is regarded as a malicious file in step S444, thus fundamentally preventing the risk of unknown malicious files or DDoS attacks. In contrast, if any file or program that has been classified as a malicious file or program is not present in files or programs executed together with the unknown file DNA, the relevant file is classified as an unidentified file in step S445, and processing may be performed such that various types of information are transferred to the server 300 while monitoring is being continuously performed until pieces of information are collected to such an extent that the relevant file can be classified as a normal file or a malicious file.

Individual steps S441 to S445 in the present embodiment may be implemented such that if a file or a program corresponding to the queried file DNA in the file classification procedure (S440) presented in FIG. 5 is not present in the file DNA statistics DB 320, steps S441 to S445 are performed prior to classifying the relevant file or program as an unidentified file or program.

FIG. 9 is a diagram showing the blocking range of files in accordance with an embodiment of the present invention. Structurally, the file belongs to a specific program, and the process of the file currently being executed may have threads corresponding to a lower concept. According to an embodiment, from the standpoint of this, it is possible to set prevention levels for individual layers.

In a first embodiment, the network behavior of a thread (thread A1-1b) that is included in the process of a file (file A1) for which the risk level of a DDoS attack is determined to be high and that is configured to generate traffic for a DDoS attack can be blocked. The reason for this is that even if it is determined that a specific file has a high probability of causing a DDoS attack by performing file DNA query and inspection, threads actually and directly causing a DDoS attack using excessive network traffic may be only a part of the threads.

In a second embodiment, the network behavior of the process (process A1-1) of the file (file A1) for which the risk level of a DDoS attack is determined to be high can be blocked. In general, since a DDoS attack is aimed at generating a considerable amount of network traffic and paralyzing a specific system, actions may be taken which block the network behavior of the process responsible for making the network traffic greater than a DDoS threshold in the relevant file.

In a third embodiment, all behavior of a program (program A) including the file (file A1) for which the risk level of a DDoS attack is determined to be high can be blocked. Since a DDoS attack may cause the leakage of personal information, the spread of malware, and damage to the system, in addition to network behavior, there may be a need to block all behavior of the program to which the relevant file belongs, such as file manipulation, registry manipulation, memory manipulation, or network manipulation.

Figure 10A:
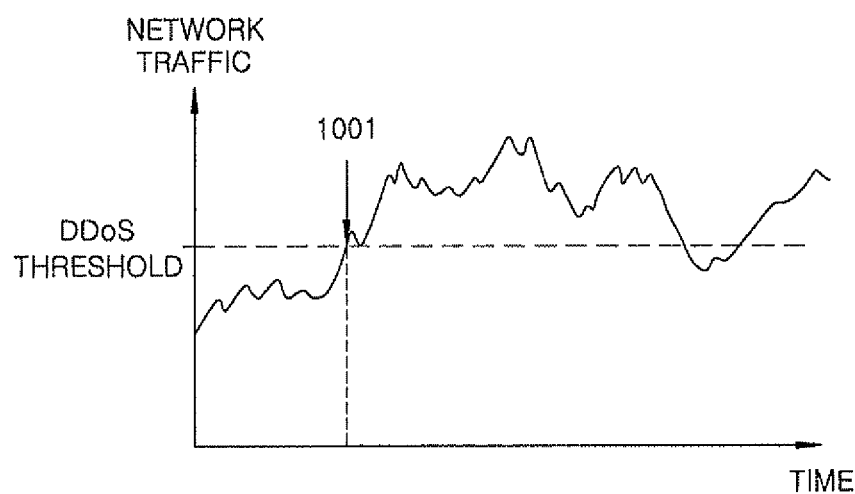
FIGS. 10A and 10B are diagrams showing a time point at which network traffic greater than a DDoS threshold is detected in accordance with an embodiment of the present invention.
Figure 10B:
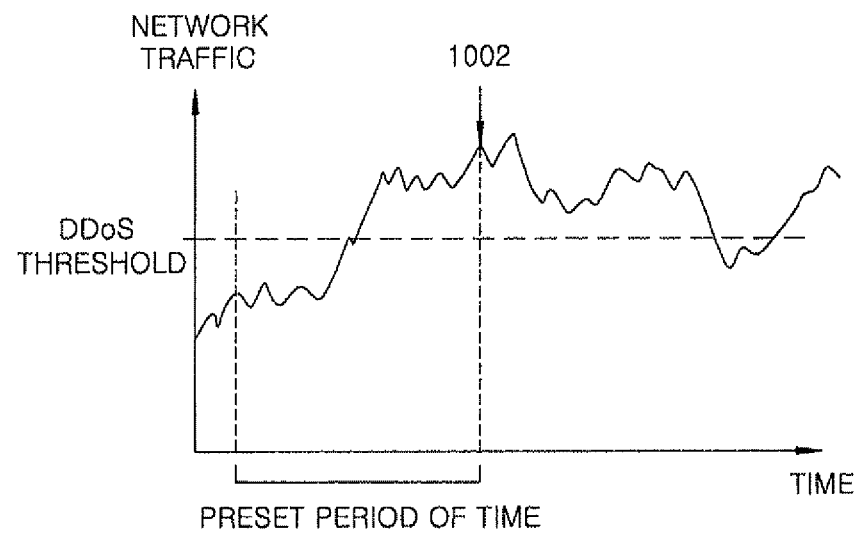

FIGS. 10A and 10B illustrate the time point at which network traffic greater than a DDoS threshold is detected in accordance with an embodiment of the present invention. With the passage of time, network traffic fluctuates. According to an embodiment, the time point from which network traffic is determined to have exceeded a preset DDoS threshold may be differently set.

FIG. 10A illustrates the case where from the time point 1001 at which measured network traffic instantaneously exceeds a preset DDoS threshold, the network traffic is determined to be greater than the DDoS threshold.

FIG. 10B illustrates the case where from the time point 1002 at which the average of network traffic totalized for a preset period of time having a predetermined length exceeds a preset DDoS threshold, network traffic is determined to be greater than the DDoS threshold. According to the embodiment, various types of statistical values other than a simple average may be used.

The modules, functional blocks or means of the present embodiments may be implemented as various well-known elements such as electronic circuits, integrated circuits, or Application Specific Integrated Circuits (ASICs), and may be implemented as individual elements or as a combination of two or more elements.

As described above, although, the embodiments have been described for the sake of providing an understanding of the present invention, those skilled in the art will appreciate that the present invention is not limited to the specific embodiments described in the present specification, and can be modified, changed and replaced in various manners without departing from the scope of the present invention. For example, the technology of the present invention can be applied to, for example, pictures or images that can be displayed on a display such as a Liquid Crystal Display (LCD), instead of text. Therefore, all modifications and changes belonging to the scope of the present invention can be included in the accompanying claims.

What is claimed is:

1. A method of detecting and preventing a Distributed Denial of Service (DDoS) attack in a cloud computing environment including a plurality of clients connected to a server, comprising: providing, by the server, an agent that is installed in a client and that monitors a file currently being executed by the client; collecting, by the server, file deoxyribonucleic acid (DNA) extracted from a file currently being executed on each of the plurality of clients and traffic information about network traffic caused by the file, from each of the plurality of clients by using the agent; analyzing, by the server, a risk level of a DDoS attack based on whether the file DNA of the file is malicious or unidentified and based on the traffic information; sending a command related to whether to block the file to the client according to the analyzed risk level; updating the agent based on a result of the analyzing; and providing, by the server, the updated agent to the client, wherein said analyzing is configured such that:

the server queries a file DNA statistics database, which stores file DNA statistical information obtained by analyzing file DNAs collected from the plurality of clients, about the file DNA of the file, and then classifies the file as a normal malicious or unidentified file, and when the network traffic is greater than a preset DDoS threshold and the file is classified as a malicious file, an analysis unit analyzes the file as having a high risk level, and when the network traffic is greater than the preset DDoS threshold and the file is classified as an unidentified file for which information about characteristics of the file is not stored in the DNA statistics database, the analysis unit analyzes the risk level of the file using statistical analysis of the file DNA of the file, and wherein the statistical analysis is implemented such that: when network traffic generated by an identical file or one or more unidentified files in the plurality of clients is greater than the preset DDoS threshold, or when amounts of network traffic generated for an identical destination in the plurality of clients are individually greater than the preset DDoS threshold, or when a number of clients that generate network traffic greater than the preset DDoS threshold, for an identical destination, among the plurality of clients is greater than a preset threshold number of DDoS clients, the file is analyzed as having a high risk level.

2. The method of claim 1, wherein: when the file DNA of the file is not present in the file DNA statistics database, the file DNA of the file is stored in the file DNA statistics database, the file DNA statistics database is queried for file DNA of associated files that are executed together when the file is executed, and when one or more of the associated files are classified as malicious files, the file is classified as a malicious file.

3. The method of claim 1, wherein said sending a command is configured to send a command to continuously monitor the file to the client when the file is classified as an unidentified file.

4. The method of claim 1, wherein one or more of the preset DDoS threshold and the preset threshold number of DDoS clients are determined based on results of statistical analysis of amounts of network traffic for respective previous destinations stored in the server.

5. The method of claim 1, wherein the file DNA statistical information comprises: results of statistical analysis of attribute information including one or more of a file name of a file corresponding to the file DNA collected from each of the plurality of clients, creation date of the file DNA, and a number of times the file is registered in a database, results of statistical analysis of association information including file DNAs of other files that are executed together with the file corresponding to the file DNA collected from the client, and results of statistical analysis of behavior information including one or more of file access, registry access, memory access, and network access performed by the file corresponding to the file DNA collected from the client.

6. The method of claim 1, wherein the network traffic is determined to be an instantaneous measured value of the network traffic or a statistical value of the network traffic obtained for a preset period of time.

7. The method of claim 1, wherein said sending a command is configured to send the command to block the file to the client if the file is analyzed as having a high risk level.

8. The method of claim 7, wherein one or more of behavior of a program including the file, network behavior of a process of the file, and network behavior of a thread that is included in the process of the file and that generates traffic for the DDoS attack are designated as prevention targets.

9. The method of claim 1, wherein: the client receives a protection destination list related to destinations desired to be protected, from the server and stores the protection destination list, and when the network traffic is greater than the preset DDoS threshold, and a destination of the network traffic is included in the protection destination list, the client blocks the file.

10. The method of claim 1, wherein the server requests the client to transmit the traffic information when the network traffic is greater than the preset DDoS threshold.

11. A server for detecting and preventing a Distributed Denial of Service (DDoS) attack, the server being connected to a plurality of clients and configured to detect and prevent the DDoS attack, comprising: an agent transmission unit for transmitting, to a client, an agent that is a monitoring program, the agent being installed on the client; an information-collecting unit for collecting file deoxyribonucleic acid (DNA) extracted from a file currently being executed on each of the plurality of clients and traffic information about network traffic caused by the file from the client by using the agent that is a monitoring program installed on the client; a file DNA statistics database for storing file DNA statistical information obtained by analyzing the file DNA collected from the client;

an analysis unit for analyzing a risk level of a DDoS attack based on whether the file DNA of the file is malicious or unidentified and based on the traffic information, wherein the analysis unit queries the file DNA statistics database about the file DNA of the file; and a command unit for sending a command related to whether to block the file to the client according to the analyzed risk level, wherein when the network traffic is greater than a preset DDoS threshold and the file is classified as a malicious file, the analysis unit analyzes the file as having a high risk level, and wherein when the network traffic is greater than the preset DDoS threshold and the file is classified as an unidentified file for which information about characteristics of the file is not stored in the DNA statistics database, the analysis unit analyzes the risk level of the file using statistical analysis of the file DNA of the file, wherein the agent is updated based on the results of analyzing by the analysis unit, wherein the updated agent is transmitted to the client by the agent transmission unit, and wherein the statistical analysis is configured such that: when network traffic generated by an identical file or one or more unidentified files in the plurality of clients is greater than the preset DDoS threshold, or when amounts of network traffic generated for an identical destination in the plurality of clients are individually greater than the preset DDoS threshold, or when a number of clients that generate network traffic greater than the preset DDoS threshold, for an identical destination, among the plurality of clients is greater than a preset threshold number of DDoS clients, the file is analyzed as having a high risk level.

12. The server of claim 11, wherein the analysis unit is configured such that if when the file DNA of the file is not present in the file DNA statistics database: the analysis unit stores the file DNA of the file in the file DNA statistics database, the analysis unit queries the file DNA statistics database about file DNA of associated files that are executed together when the file is executed, and the analysis unit classifies the file as a malicious file when one or more of the associated files are classified as malicious files.

13. The server of claim 11, further comprising a traffic statistics database for storing traffic statistical information including a subject causing the network traffic collected from the plurality of clients, a destination of the network traffic, and an amount of network traffic.

14. The server of claim 11, further comprising: an agent storage unit for storing the agent.

15. The server of claim 11, further comprising a protection destination database for storing a protection destination list related to destinations desired to be protected against the DDoS attack, wherein the agent causes the client to block the file when the network traffic is greater than the preset DDoS threshold and a destination of the network traffic is included in the protection destination list.

* * * * *